United States Patent [19]
Johnson

[11] Patent Number: 5,517,528
[45] Date of Patent: May 14, 1996

[54] MODULATION METHOD AND APPARATUS FOR DIGITAL COMMUNICATIONS

[75] Inventor: Neldon P. Johnson, American Fork, Utah

[73] Assignee: International Automated Systems, Inc., American Fork, Utah

[21] Appl. No.: 285,030

[22] Filed: Aug. 2, 1994

[51] Int. Cl.⁶ .................................................. H04L 27/00
[52] U.S. Cl. ...................... 375/259; 370/95.3; 370/110.1
[58] Field of Search .................................... 375/259, 246; 370/95.1, 95.3, 110.1, 110.4; 455/70

[56] References Cited

U.S. PATENT DOCUMENTS

| | | | |
|---|---|---|---|
| 4,466,589 | 8/1988 | Fisher | 370/98 |
| 5,220,557 | 6/1993 | Kelley | 455/103 |
| 5,274,672 | 12/1993 | Weiss | 375/305 |
| 5,367,536 | 11/1994 | Tsujimoto | 375/363 |
| 5,369,669 | 11/1994 | Tombal et al. | 370/110.4 |
| 5,390,185 | 2/1995 | Hooijmans et al. | 370/98 |

Primary Examiner—Stephen Chin
Assistant Examiner—T. Ghebretinsae
Attorney, Agent, or Firm—J. David Nelson

[57] ABSTRACT

A method and apparatus for single signal, multiple channel digital information transfer through pulses with time slot allocation. The apparatus consists of one or more transmitting devices and one or more receiving devices. Multiple source signals are each allocated a unique time slot between successive synchronization pulses. Digital signals from each source are converted to positive analog information spikes which are combined in their respective time slot with a negative reference spike of uniform magnitude to form an information pulse. The total signal, which consists of successive synchronization pulses interspersed with information pulses for each signal source, each within its allocated time slot, is transmitted to the receivers. Each receiving device extracts the maximum information spike values and the reference spike values for one or more of the signal sources. The information spike values and the reference spike values are converted to digital and a comparison of the transmitted reference spike values with the received reference spike values is used to calibrate the received information spike values for each signal source.

45 Claims, 6 Drawing Sheets

LEGEND
1- Transmission Apparatus
2- Digital to Analog Convertor
3- Digital Input
4- Reference Computer Circuit
5- Sync Pulse Receiver
6- Reference Spike
7- Sync Pulse
8- Sync Pulse Generator
9- Information Spike
10- Transmitter
11- Information Pulse
14- Control Receiver
15- Master Control Circuit

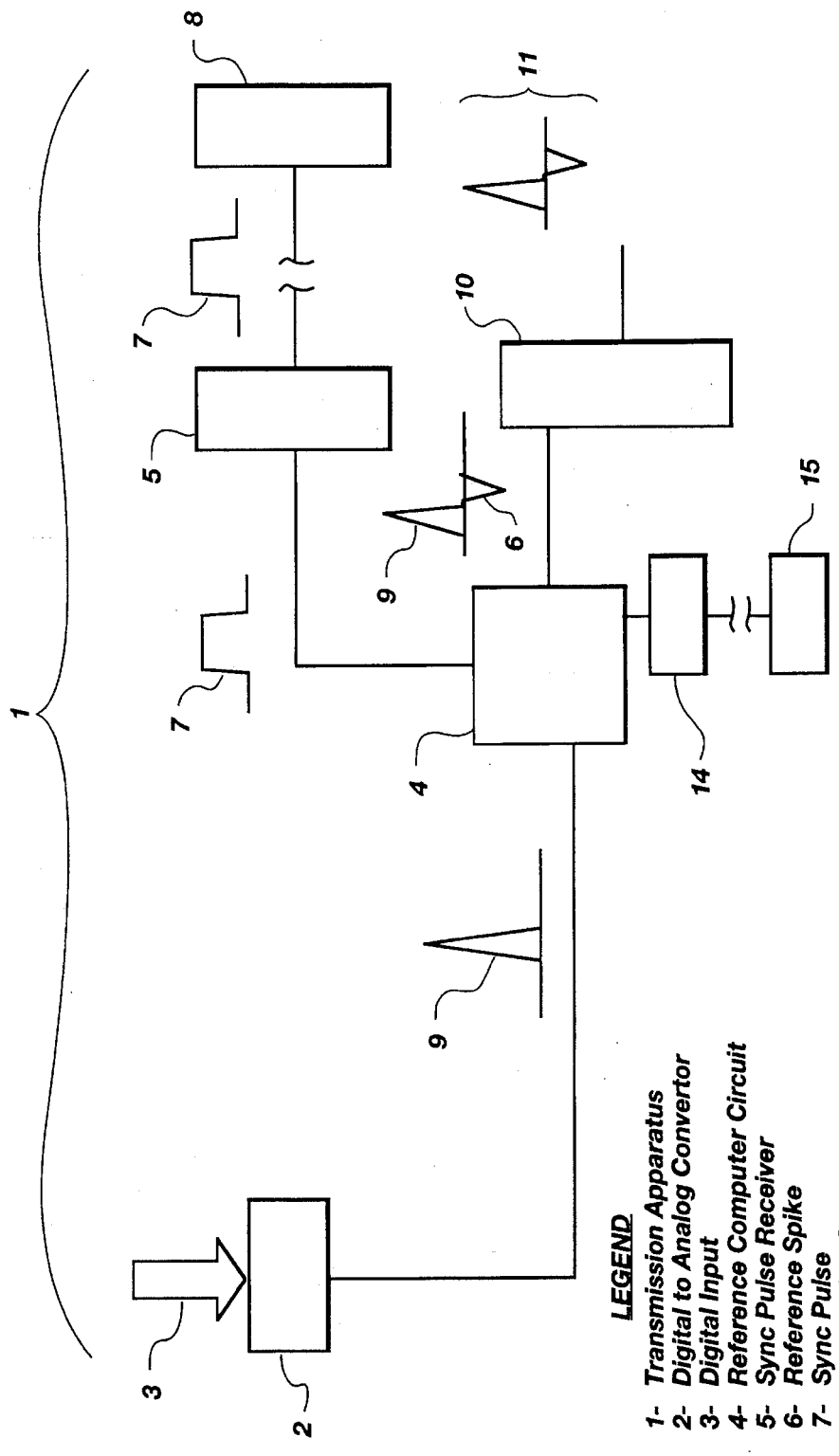

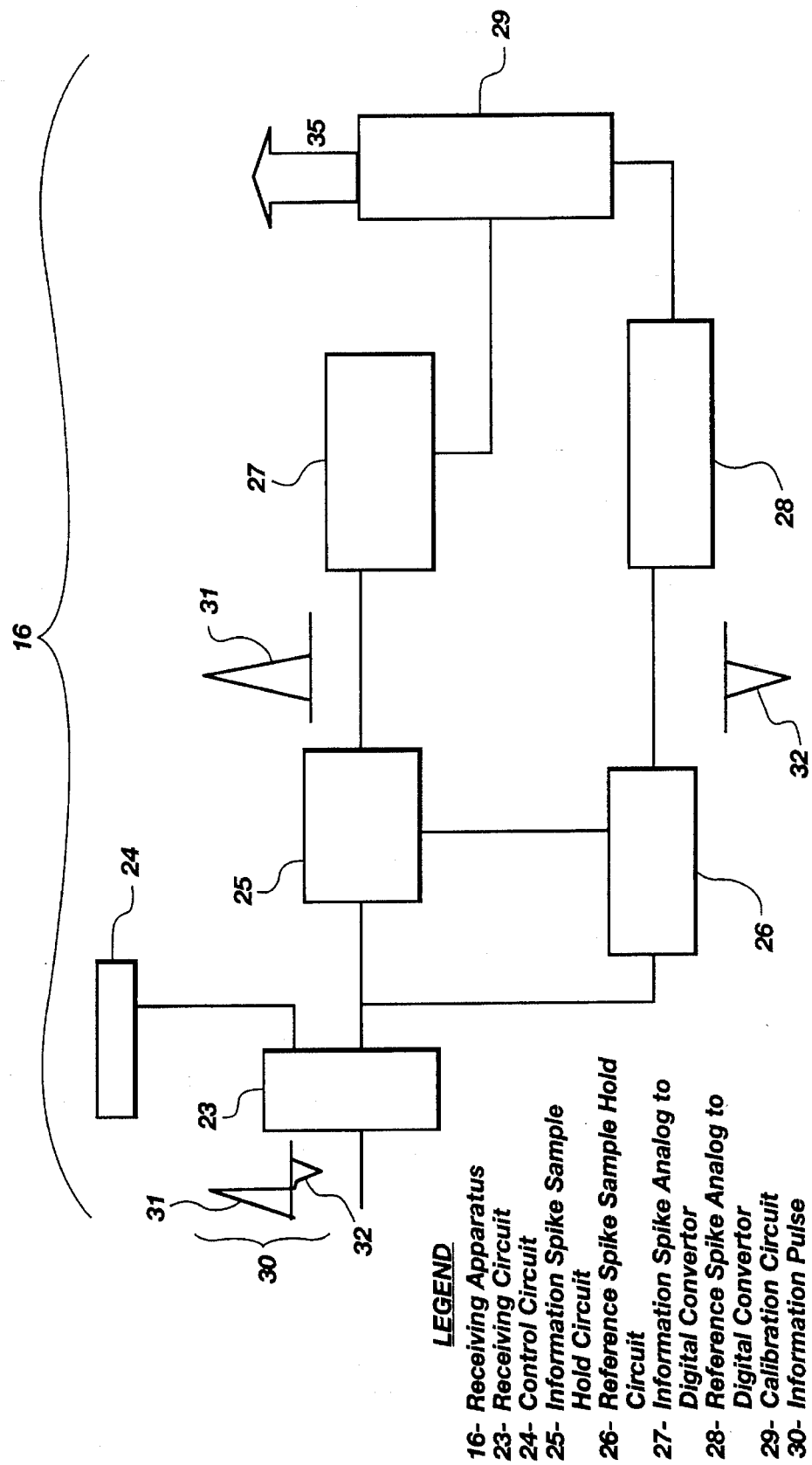

Fig. 2

LEGEND
16- Receiving Apparatus
23- Receiving Circuit
24- Control Circuit
25- Information Spike Sample Hold Circuit
26- Reference Spike Sample Hold Circuit
27- Information Spike Analog to Digital Convertor
28- Reference Spike Analog to Digital Convertor
29- Calibration Circuit
30- Information Pulse
31- Information Spike Portion of Information Pulse
32- Reference Spike Portion of Information Pulse
35- Reproduced Signal Values LEGEND
2- Digital to Analog Convertor
3- Digital Input
4- Reference Computer Circuit
6- Reference Spike
7- Sync Pulse
9- Information Spike
10- Transmitter
11- Information Pulse
12- Transmission Apparatus
13- Sync Pulse Circuit
15- Master Control Circuit

MODULATION METHOD AND APPARATUS FOR DIGITAL COMMUNICATIONS

FIELD OF THE INVENTION

This invention relates to methods and apparatuses for modulation of electromagnetic waves for information transfer and more particularly to methods and apparatuses for modulating electromagnetic waves for digital information transfer.

BACKGROUND OF THE INVENTION

There are several principal modulation methods for electromagnetic signals used in communications. The ones that are most widely used are frequency modulation (FM), amplitude modulation (AM), pulse width modulation (PWM) and phase modulation (PM). There have also been some other less widely used methods for transmitting and receiving information by means of electromagnetic signals. The demands of modern information transfer, in particular computer networking and multi-media communications, have increased the need to transmit more and more information on limited channels of communication. With the ever increasing capacity of digital computers, there is an ever increasing demand for modulation methods to enhance the volume of digital data that can be transmitted and received.

Methods have been developed for increasing the amount of information that can be transmitted and received. One such method is described in U.S. Pat. No. 4,387,455 to Schwartz. This method utilizes several different modulation systems at the same time over the same channel. However, this method uses FM and AM modulation and requires several cycles for each digital bit. Similarly the device disclosed in U.S. Pat. No. 4,103,238 to Deming, provides for three modulation patterns to be transmitted simultaneously on a single carrier wave. Again, multiple cycles are required for each digital bit. The deficiencies of these methods are typical of efforts to increase the amount of information transmitted.

The method disclosed in U.S. Pat. No. 4,584,692 to Yazuka relies on the same common modulation methods but introduces polarity modulations as a means of enhancing the amount of information that can be transmitted. The polarity of the waves is modulated to encode information and then the original wave and the modulated wave are compared to allow decoding of the information. This results in a modest increase in the amount of information that can be transmitted over a single signal.

Various methods designed specifically for digital information transfer provide some enhancement of the data transfer capabilities. The method disclosed in U.S. Pat. No. 4,001,728 to Schneider is a method of transmitting digital signals through the use of pulse width modulation on an incremental ramp wave. A method of transmitting multiple digital signals on a single carrier wave is disclosed in U.S. Pat. No. 4,347,616 to Murakami. Another method providing for the simultaneous transmission of multiple digital signals independently modulated is disclosed in U.S. Pat. No. 3,805,191 to Kawai.

The method disclosed in U.S. Pat. No. 3,890,620 to Toman provides for the modulation of a carrier wave at prescribed time intervals with digital information. This method, however, points up the limitations of attempts to enhance existing methods of digital information transfer. Incoming digital data must first be stored and then it is recalled for transmission at a rate compatible with the carrier wave modulation. The receiver then extracts the digital information from the signal by synchronization with the transmitter. The resultant signal is subject to interference at both the carrier frequency and the modulation frequency.

The present invention is a method and apparatus for transmitting digital communications. The present invention's primary advantage over traditional modulation techniques is the quantity of digital information that can be transmitted and received. Both FM and AM modulation were developed for transmitting analog signals and, for that reason, are cumbersome in transmitting digital signals. The present invention is designed specifically for transmitting digital signals.

This method does not require a carrier wave to transmit the information. Depending upon the information signal sources and the frequencies utilized, thousands of times more information can be transmitted. In FM systems hundreds and even thousands of cycles are required for just one byte of information. This is also true for AM modulation systems. The present invention provides for the placement of two bytes or more of information in each and every cycle.

One objective of the present invention is to provide a digital information transfer method which does not require a carrier wave.

Another objective of the present invention is to provide a method and apparatus which substantially increases the amount of digital information that can be transmitted on a single signal.

A further objective is to provide a method and apparatus for transmitting and receiving multiple channels of information on a single communication signal.

A still further objective of the present invention is to provide a method and apparatus for continuously synchronizing a transmitter and receiver so that multiple channels of information can be reliably transmitted on a single communication signal by allocation of time slots to each channel.

A still further objective is to provide a method and apparatus for received signals to be calibrated by the receiver to compensate for signal attenuation, losses, noise, distortion and interference, and thereby to provide for very accurate read out of the digital information transmitted.

A still further objective is to provide a method and apparatus for digital information transfer which can utilize either a common synchronized transmitter or a plurality of remote synchronized transmitters and can utilize either a common receiver or a plurality of receivers.

SUMMARY OF THE INVENTION

The present invention provides a method and apparatus for increasing the amount of digital information that can be transmitted over an electromagnetic signal. The apparatus of a preferred embodiment of the present invention includes computer circuits and transmission and receiving devices. Embodiments of the apparatus can include multiple transmitters at multiple locations or a single transmitter which is accessed by each signal source. Under either embodiment, each signal source is allocated a time slot for each successive cycle between synchronization pulses. If multiple transmission locations and transmission apparatuses are utilized, each such transmission apparatus is equipped with an analog receiver for receiving synchronization pulse transmissions from a master synchronization pulse transmitter. Each remote signal source is allocated a unique time slot between successive synchronization pulses for transmission of information simultaneously with other remote signal sources which are each allocated a different time slot between the successive synchronization pulses. Likewise, if a common transmission location and transmission apparatus is utilized, each signal source that accesses the system is allocated a unique time slot between successive synchronization pulses which are generated by the master synchronization pulse transmitter.

For each signal source, the digital value of the source signal during its allocated time slot, is converted, under a preferred embodiment, to a positive analog spike, called an information spike, with the magnitude of the spike being directly proportional to the value of the digital input. Preceding or following each information spike, and within the allocated time slot for the information spike, the transmission apparatus generates a negative spike which is called the reference spike. The reference spike is the control portion of the signal and is set at a constant value. The information spike and the reference spike together constitute the information pulse. Whether the embodiment utilizes remote transmission locations and apparatuses or a common transmission location and apparatus, an information pulse is generated for each signal source for each cycle of its allocated time slot.

The information pulse generated for each signal source is transmitted in that time slot for each successive cycle of the synchronization pulses. These transmissions may be from remote locations or from a common location and may be wireless or may be transmitted via any of the well known media.

The period of each information pulse is determined by the ability of the receiving circuits to handle them, but will generally be as small as possible to reduce the effects of noise and distortion.

The receiving apparatus calibrates each information signal for each channel respectively by using the magnitude of the negative portion of the information signal as measured by the receiving apparatus, adjusting the negative portion to the known value of the reference spike at transmission, and adjusting the positive portion proportionally. This ensures that the effects of signal attenuation, losses, noise, distortion and interference are minimized. The synchronization pulses provide for continuous synchronization of the transmitting apparatus and the receiving apparatus so that channel tracking integrity is maintained at all times. A common receiver can be utilized from which the various channels of information are disseminated to users or a plurality of receivers can be utilized at various points of use or dissemination.

BRIEF DESCRIPTION OF THE DRAWINGS

FIG. 1: A schematic of a transmission apparatus of the invention for remote transmission.

FIG. 2: A schematic of a receiving apparatus of the invention.

DETAILED DESCRIPTION OF THE PREFERRED EMBODIMENTS

Figure 3:
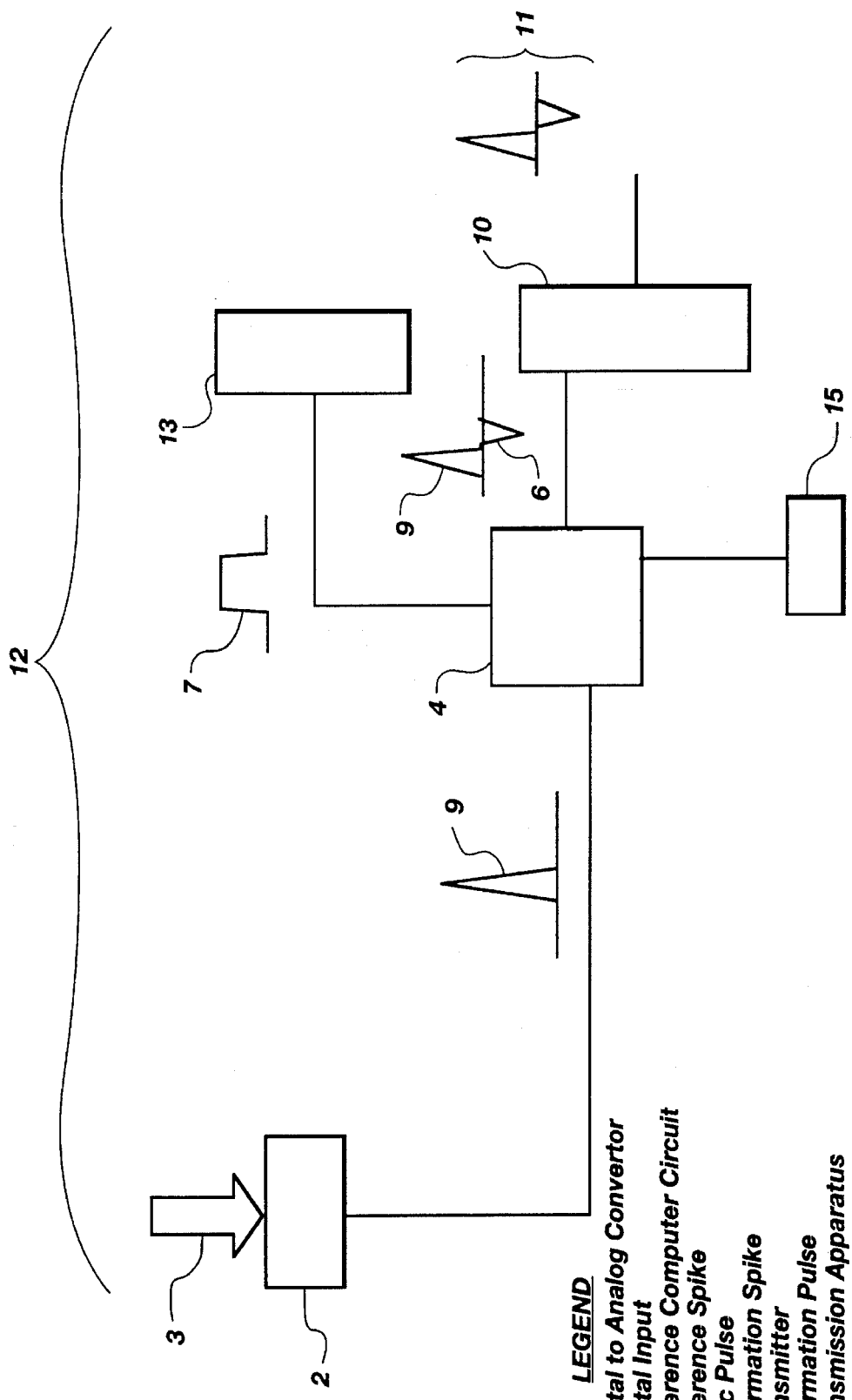
FIG. 3: A schematic of a transmission apparatus of the invention for common transmission.

Referring first to FIG. 1, there is indicated generally therein a schematic of a preferred embodiment of a transmission apparatus 1 of the invention. This embodiment of the transmission apparatus is utilized for remote, simultaneous transmission of digital signals. Under this embodiment, the transmission apparatus comprises a digital to analog converter 2, a reference computer circuit 4, a master control circuit 15, a control receiver 14, a remote master synchronization pulse generator 8, a synchronization pulse receiver 5, and a transmitter 10.

Under this embodiment, a digital input 3, for each signal source, is input to its respective transmission apparatus 1. Synchronization pulses 7 of a selected uniform wave form and frequency are generated by the master synchronization pulse transmitter 8 and are transmitted to each of the remote transmission apparatuses 1 where it is received by the analog synchronization pulse receiver 5. The synchronization pulses can be either voltage pulses or power pulses. Each of the signal sources is allocated a time slot between the successive synchronization pulses by the remote master control circuit 15 and the digital value of the signal source at each of its successive allocated time slots is converted to an analog information spike, the magnitude of which, under a preferred embodiment, is directly proportional to the digital value of the source signal. For other embodiments, the magnitude of the information spike can be determined through the use of an algorithm based upon the digital input value.

In preferred embodiments, the output signal from the digital to analog convertor 2 is a positive information spike 9. However, under other embodiments, the information spike can be negative or positive. Under preferred embodiments, the information spike is a voltage spike, but under other embodiments the information spike may be a power spike.

Under a preferred embodiment, a reference spike 6 of a uniform magnitude and wave form is generated by the reference circuit 4 for each transmission apparatus for each allocated time slot. The reference spike may be generated before or after the information spike but within the time slot allocated for the information spike. Under a preferred embodiment, the reference spike is negative so as to reduce the possibility of the reference spike interferring with the information spike and to simplify the segregation of the information spike and the reference spike values after transmission. However, other embodiments may provide for positive reference spike values. Also, under other embodiments, a lesser number of reference spikes are generated for each cycle of the synchronization pulses. As few as one reference spike per synchronization pulse cycle may be utilized. Also, the synchronization pulse may be used for reference instead of a separate reference spike. Under such an embodiment, the analog synchronization pulse receiver 5 must provide for the calibration of the synchronization pulses.

Under a preferred embodiment as shown in FIG. 1, the information spike 9 is combined by the reference circuit 4 with a reference spike 6 generated by the reference circuit 4. Under a preferred embodiment, the reference spike is of a preselected, constant, negative value and of a uniform wave form. Thus, under a preferred embodiment, the information spike is the positive portion of an information pulse 11 and the reference spike is the negative portion of the information pulse for each signal source.

Referring now to FIG. 3 which shows another preferred embodiment of the transmission apparatus, a common transmission apparatus 12 simultaneously accepts digital signals 3 from one or more sources. A synchronization pulse circuit 13 generates synchronization pulses 7 of a uniform magnitude, wave form and frequency. The master control circuit 15 allocates each signal source a time slot between successive synchronization pulses. For each cycle of the synchronization pulse, an information spike 9 is generated for each input signal within its allocated time slot by the digital to analog convertor 2. A reference computer circuit 4 generates a reference spike 6 for each signal source within its assigned time slot and combines the information spike and the reference spike to form an information pulse 11. The information pulse for each signal source is transmitted by the common transmission apparatus 12 to the receiving apparatus 16 shown on FIG. 2.

Figure 4:
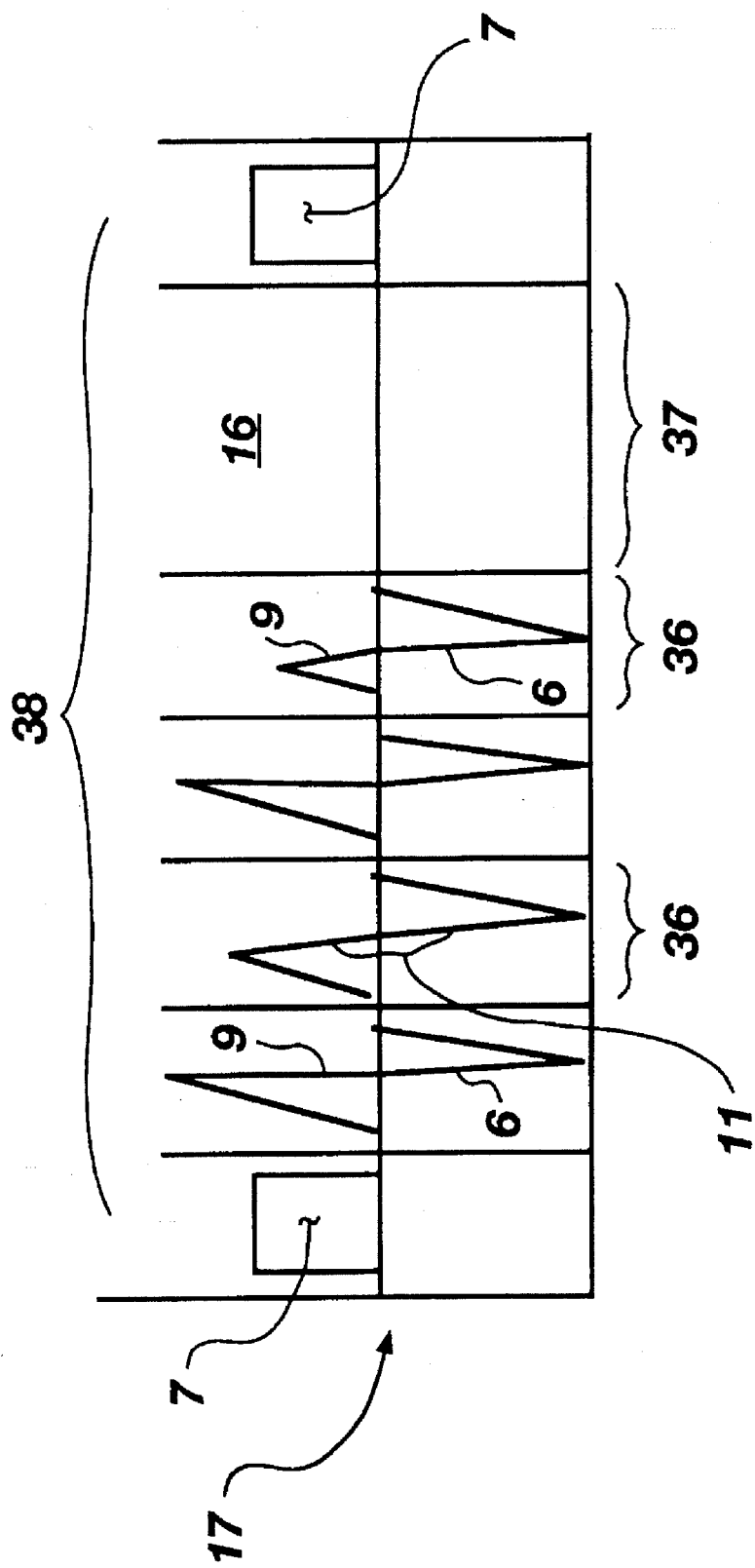
FIG. 4: An illustration of an example of a total transmitted and received signal.

Whether an embodiment of the transmission apparatus providing for the remote and separate transmission of analog information pulses 11 for signal sources as shown in FIG. 1 or an embodiment providing for the transmission of information pulses for signal sources from a common transmission apparatus as shown in FIG. 3, is used, the total signal 17 as illustrated in FIG. 4, is the same for the same source signals. Under the embodiment shown in FIG. 1, the synchronization pulses are transmitted by the master synchronization pulse generator 8, and each of the time slotted information pulses 11 are transmitted from the various remote transmission apparatuses 1. The total signal received by a receiver 16 then consists of successive synchronization pulses 7 coming from the master synchronization pulse generator 8 interspersed with the time slotted information pulses coming from the various remote transmitters 10. Under the embodiment shown in FIG. 3, the total signal received by a receiving apparatus 16 is comprised of the successive synchronization pulses interspersed with the time slotted information pulses coming from the common transmitter 10.

Under a preferred embodiment, the synchronization pulses are of a uniform, rectangular and positive voltage wave form, with a uniform frequency selected as desired. The synchronization pulses allow a receiving apparatus 16 to continuously verify the time slots of the incoming signal 17 so that the respective information pulses can be extracted from the correct assigned time slots or channels. The minimum frequency of the synchronization pulse will be dependent upon the nature of the information being transmitted over the various channels. For example, approximately 1,000 television channels can be transmitted with a single signal with this invention as it is limited only by minimum frequency at which successive audio and video signals must be received to produce the desired resolution for video and audio reproduction. Other types of media or signal types have different requirements which will affect the minimum frequency of the synchronization pulse. The frequency of the synchronization pulse, therefore, would be adjusted depending upon the application.

For the common transmission apparatus shown in FIG. 3, the master control circuit 15 monitors and tracks all of the incoming signals and allocates time slots or channels for the respective information pulses for each of the accepted incoming signals. Referring to FIG. 4, the total signal 17 that is transmitted by the transmission apparatus is comprised of synchronization pulses 7 of a selected uniform wave form and frequency and information pulses 11 for each information channel. The time between the respective synchronization pulses 38 is determined by the nature of the signals being transmitted and the total number of channels being transmitted. For the remote transmission apparatus shown in FIG. 1, one master control circuit 15 monitors and tracks all the source signals and allocates time slots or channels for each of the accepted signals and transmits this control information to a control receiver 14 for each remote transmission location and transmission apparatus 1.

Figure 5:
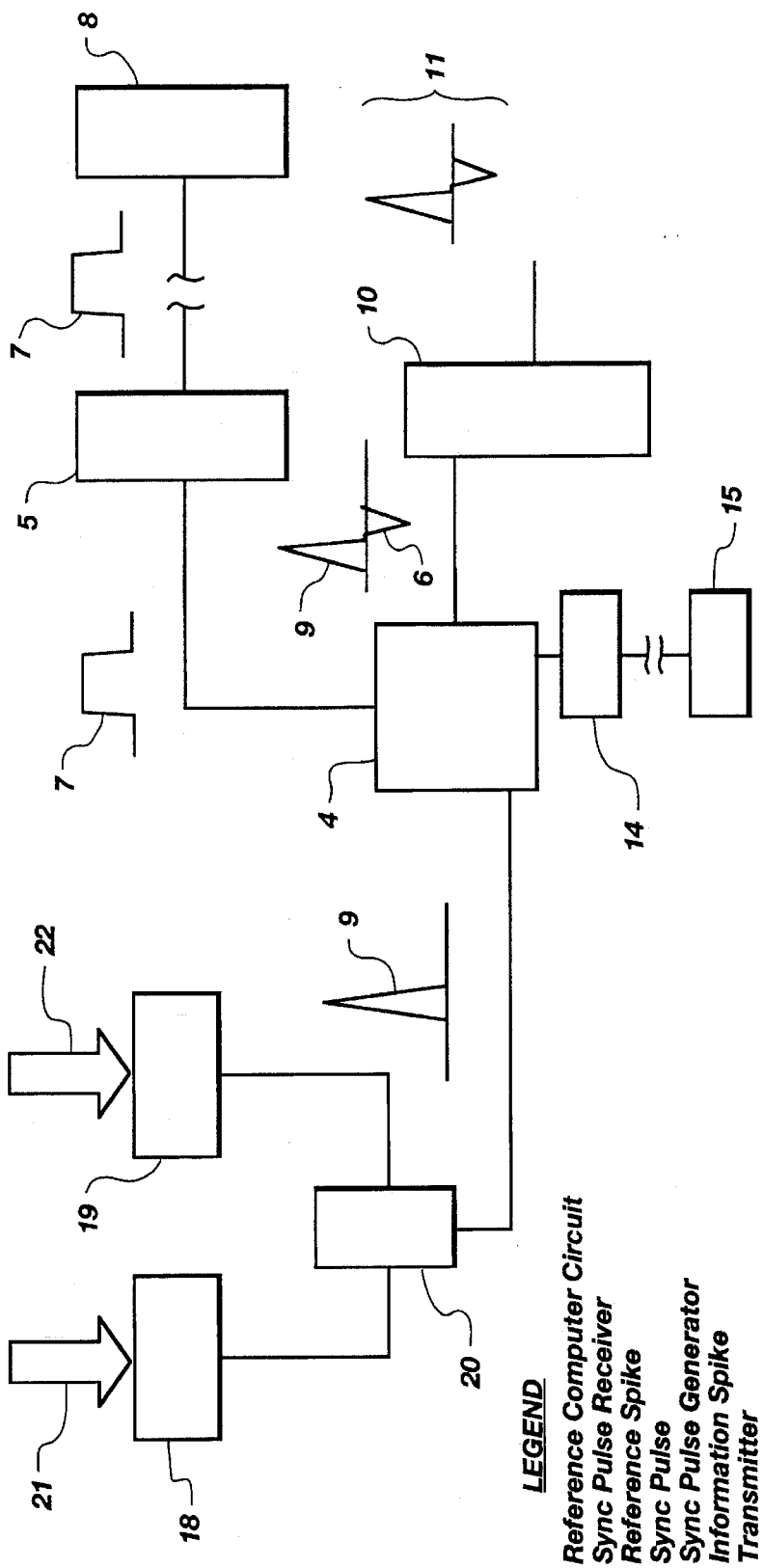
FIG. 5: A schematic of a transmission apparatus of the invention for remote transmission with an analog adder for combining two signals.
Figure 6:
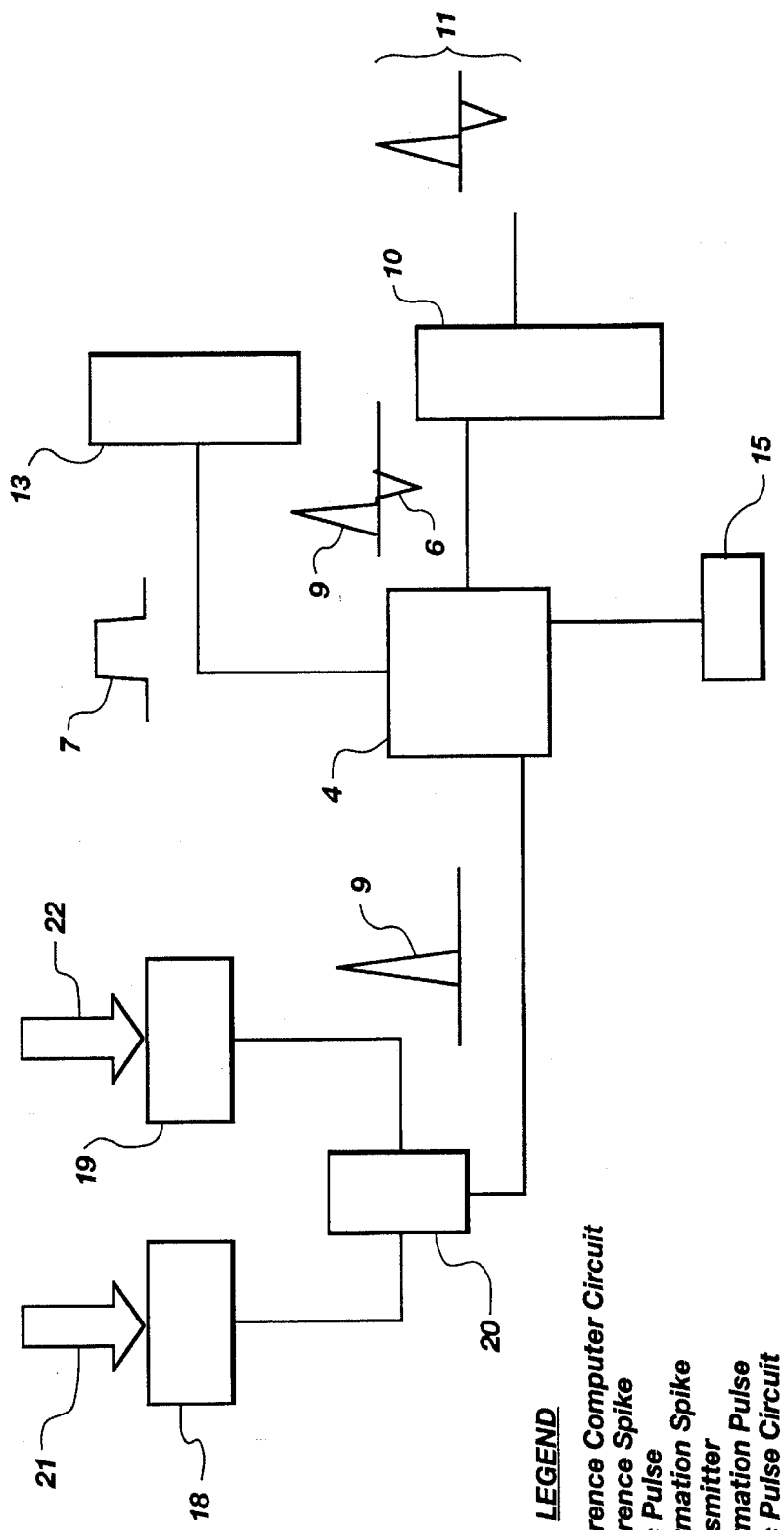
FIG. 6: A schematic of a transmission apparatus of the invention for common transmission with an analog adder for combining two signals.

Other embodiments of the invention, whether for remote transmission as shown in FIG. 5 or for common transmission as shown in FIG. 6, provide for further enhancement of the amount of information that can be transmitted by incorporating a first digital to analog convertor 18, a second digital to analog convertor 19, and an adder 20, which allows a first digital byte input 21 and a second digital byte input 22, such as the video and audio signals for a television transmission, to be converted from digital to analog and then added. The total signal for a given time slot or channel is then a combined signal that can be transmitted as one.

The embodiments shown in FIG. 5 and FIG. 6 could also be used to combine two input signals with one being converted to a positive analog signal and the other to a negative analog signal by the digital to analog convertors 18 & 19. This would work best with a less frequent reference spike or using the synchronization pulse as a reference for calibration.

While for preferred embodiments, the synchronization pulses and the information pulses are voltage pulses, other embodiments may utilize power pulses. Also, while for preferred embodiments the magnitude of an information spike is directly proportional to its corresponding digital input value, other embodiments may provide for the magnitude of the information spike to be determined by an algorithm based on the digital input value.

FIG. 4 illustrates the total signal 17 transmitted and received, whether remote transmission (FIG. 1) or common transmission (FIG. 3) is utilized. The total signal 17 consists of one or more information pulses 11 within their respective time slots 36, interspersed between successive synchronization pulses 7. The period, magnitude and wave form of the synchronization pulses 7 is uniform and adjustable. Each signal source is admitted to the network by the master control circuit 15 and allocated a time slot 36. Unallocated time space 37 between synchronization pulses is available for subsequent allocation to other signal sources.

Other embodiments may provide for interaction between the master control circuit 15 and the synchronization pulse generator 8 (FIG. 1) or 13 (FIG. 3) so that the frequency of the synchronization pulses is adjusted, based upon the number of channels being transmitted.

Referring now to FIG. 2, there is indicated generally therein a preferred embodiment of a receiving apparatus 16. This embodiment comprises a receiving circuit 23, a control circuit 24, an information spike sample hold circuit 25, a reference spike sample hold circuit 26, an information spike analog to digital convertor 27, a reference spike analog to digital convertor 28, and a calibration circuit 29. For embodiments of the transmission apparatus as shown in FIG. 1, which provide for the remote transmission of time slotted signals, the receiving apparatus 16 receives the incoming total signal 17. The receiver control circuit 24 uses the synchronization pulses to allocate and maintain channel separation. The receiver control circuit 24 may also control which signals are allowed to pass through the receiving circuit 23. The receiving circuit 23 separates the information spike portion 31 of the information pulse from the reference spike portion 32 for each time slot or channel. The information spike sample hold circuit 25 extracts the maximum positive information spike value for each time slot or channel for each cycle of the received channel signal. Likewise, the reference spike sample hold circuit 26 extracts the maximum negative reference spike value for each channel. The receiver control circuit 24 establishes the channel time slots for the information spike sample hold circuit 25 and the reference spike sample hold circuit 26.

The information spike analog to digital converter 27 converts the values obtained by the information spike sample hold circuit 25 for each channel to digital. The reference spike analog to digital converter 28 converts the values obtained by the reference spike sample hold circuit 26 for each channel to digital. Under a preferred embodiment, the analog to digital converters 27 and 28 are special flash analog to digital converters.

A preferred embodiment uses a special flash analog to digital circuit developed for the present invention. The circuit consists of several sets of flash analog digital circuits. The flash consists of two arrays. The first array consists of ten flash circuits vertically and six horizontal for sixty circuits in all. The first set of ten is the most significant number, with six being the least significant. This allows it to measure a number as large as 999,999, but, however, larger arrays can be used for any size number.

A calibration circuit 29 compares the digital values from the reference spike analog to digital convertor 28 for each channel with the transmission digital value for the reference spike and a calibration factor is determined which accounts for line loss or noise. The information spike values from the information spike analog to digital convertor 27 for each channel are then calibrated through the use of this calibration factor. In this way the original digital values of the transmitted signal for each channel are obtained. The reproduced values 35 for each signal source are then available for use or dissemination by the intended users.

Under a preferred embodiment of the invention, a master control circuit 15 monitors a multi-media network to determine the time slot to be allocated to the various incoming signals. A signal source wanting to use the network would first address the master control circuit 15 to request access to the network. The main control circuit then allocates a time slot that is not being used.

Referring again to FIG. 1, under a preferred embodiment of the invention, if an acceptable initiating signal is received by the master control circuit 15, the incoming signal is allocated an unused time slot channel. Successive cycles of the time slot then carry the latest information spike for the source from the digital analog converter 2 combined with the reference spike from the reference circuit 4. The converted analog signals for each channel are updated with each synchronization cycle.

The receiving apparatus 16 can be deployed at a single location with information dissemination occurring from the single location or can be deployed at a plurality of locations with users tuning in to the desired signals.

Under a preferred embodiment, depending upon the type of signal source of the respective channels, the minimum frequency of the synchronization pulse is the minimum frequency that will permit an acceptably accurate reproduction of the input digital signal. For data transmission applications which require precise reproduction of transmitted data, the frequency of the synchronization pulse must be at least as high as the frequency of the change of the digital source signal.

An embodiment of the invention provides an apparatus and method that would allow substantially faster computer networks. Substantially more computers could be added to any given network without degrading the network's speed. In computer networking the present invention will speed up the data transfer rates and make computer networking more efficient. It will allow for more computers to be used on a network without degrading the network. It will also allow monitors, hard drives, printers and other devices at separate addresses all to be connected together by a single link. This link could be wire, fiber optics, or wireless communication, with each component allocated a time slot channel.

Another embodiment of the invention provides for enhancement of interactive robotics. Each component of a robotics device would be controlled by a single signal with each component accessing a time slot channel. This would make it possible for work to be accomplished in a hazardous area without exposing the operator to physical risk associated with the environment and wearing a suit as designed with sensors to detect movement, touch and sight, and then transmit these movements or essential perceptions to the robot. The robot would then transmit back what it was doing, and what it was sensing. The operator in the suit would then feel what the robot was feeling, what it was seeing and what it was doing instantaneously.

Another embodiment of the apparatus and method provides for the transmission of voice data to specific addresses based upon the time slot channel allocated.

Another embodiment of the invention provides for the simultaneous transmission of a large number of video recordings. Thousands of video recordings can be transmitted simultaneously allowing users to make a selection of any of the videos at any time.

Another embodiment provides for radio and television signal transmission. The present invention greatly increases the channel capacity for the band width allowed. Furthermore, this embodiment of the invention allows the routing of specific channels to specific locations. This allows users to access a tremendous video library from their homes. It, likewise, allows users to access books at public and private libraries. It allows students to complete school work at home and to interact with their instructors as well as other students. This allows more channels for radio, televisions and cellular telephones. Furthermore, not only would the number of channels be increased, but channels would be of digital quality.

An embodiment of the invention enhances the operation of video recorders by allowing them to operate on a digital format. This embodiment also allows the replacement of the revolving head with a fixed head, which makes them more reliable and more compact. Likewise, embodiments of the invention as applied to audio recorders allow audio recorders to be made digital.

Another embodiment of the invention provides for the expansion of the capacity of cellular phone networks by assigning each call to an unallocated time slot for simultaneous transmission and then deleting the call from the network upon completion of the call, making the channel available for other users and other callers.

Under preferred embodiments of the invention, neither the information spike nor the reference spike would be modulated onto a carrier wave. However, the present invention could be used to modulate a carrier wave. In fact, under other embodiments of the invention, the information spike and reference spike could be modulated onto an FM, PM, or PWM carrier wave. The information spike could be added to or subtracted from the peak for the carrier wave. This would allow the information spikes to be removed and the information recovered without affecting the information being transmitted by the other modulation methods. After the spikes are recovered, the spikes would then be analyzed in the same manner as is provided for the preferred embodiments described above. The process of adding the spikes to the respective carriers uses the process of finding the high or the low points of each cycle and adding and subtracting the information spikes, if desired, to the selected points. Under such embodiments, a synchronization pulse would not ordinarily be used as the channel identification would arise from carrier wave identification.

An embodiment of the present invention provides for the substantial increase in the capacity of existing telephone systems. The simultaneous transmission of numerous calls from a single signal could greatly increase the capacity of existing facilities. Alternatively switching circuits could be much smaller and would be able to provide more reliable service.

Another embodiment of the invention provides for home stereos to transmit specific information to specific speakers. For example, one speaker could be for drums, one for the piano, one for brass instruments, one for strings. One could have the whole orchestra in the living room. Furthermore, the components could be connected by a single wire or the central unit could be entirely wireless.

Another embodiment of the present invention provides for shelf tags in grocery stores. Each electronic grocery store shelf price tag has its own address for each item allowing for instantaneous update of item and price changes. Each product has its own time slot and the transmission can be wireless, allowing complete freedom of location for the shelf tags.

Other embodiments of the invention and other variations and modifications of the embodiments described above will be obvious to a person skilled in the art. Therefore, the foregoing is intended to be merely illustrative of the invention and the invention is limited only by the following claims.

REFERENCES CITED 3,805,191, 4/1974, Kawai, Class: 332/9 R
3,890,620, 6/1975, Toman, Class: 343/108 R
4,001,728, 1/1977, Schneider, Class: 332/1
4,103,238, 7/1978, Deming, Class: 325/141
4,347,616, 8/1982, Murakami, Class: 375/20
4,387,455, 6/1983, Schwartz, Class: 370/11
4,584,692, 4/1986, Yazuka, Class: 375/38.1

What is claimed is:

1. An apparatus for digital information transfer comprising:

a) means for allocating one or more source digital signals to unique, repetitive time slots;

b) means for generating an analog information pulse for each said source digital signal, the magnitude of which is a function of the magnitude of the corresponding source digital signal as measured during the allocated time slot for the signal;

c) means for transmitting each of the analog information pulses within its allocated time slot;

d) means for generating and transmitting repetitive analog reference pulses, at least one reference pulse being generated and transmitted for each cycle of the time slots for the source digital signals;

e) means for receiving each of the analog information pulses within its allocated time slot and for receiving the repetitive analog reference pulses;

f) means for extracting an analog magnitude for each analog information pulse received during its allocated time slot and for extracting an analog magnitude for each reference pulse received; and g) means for generating output digital signals having digital magnitudes which are a function of said extracted analog magnitudes for the information pulses received, said digital magnitudes being calibrated by comparison of the magnitudes of the reference pulses as transmitted and the magnitudes of the reference pulses as received.

2. An apparatus as claimed in claim 1 wherein the means for generating output digital signals includes a means for calibrating the output digital signal magnitudes to correct for signal attentuation, losses, noise, distortion and interference.

3. An apparatus as claimed in claim 1 wherein the means for generating said analog information pulses for said source digital signals, the means for transmitting the information pulses within the allocated time slots, and the means for generating and transmitting repetitive analog reference pulses are deployed at a plurality of transmission locations.

4. An apparatus as claimed in claim 1 wherein the means for receiving the information pulses within the allocated time slots, the means for extracting the analog magnitudes for the information pulses received during the allocated time slots, and the means for generating output digital signals having digital magnitudes which are a function of said extracted analog magnitudes for the information pulses received are deployed at a plurality of receiving locations.

5. An apparatus as claimed in claim 1 wherein the means for generating analog information pulses generates an information pulse for each said source digital signal which is proportional to the magnitude of the corresponding source digital signal as measured during the allocated time slot for the signal.

6. An apparatus as claimed in claim 1 wherein the means for generating output digital signals generates output digital signals having digital magnitudes which are proportional to said extracted analog magnitudes for the information pulses received.

7. An apparatus for digital information transfer comprising:

a) means for generating synchronizing pulses of uniform wave form and frequency;

b) means for allocating one or more source digital signals to unique time slots between successive synchronizing pulses;

c) means for generating an analog information spike for each source digital signal, the magnitude of which is a function of the magnitude of the corresponding source digital signal as measured during the allocated time slot for the source digital signal;

d) means for generating an analog reference spike during the allocated time slot of each source digital signal, the time period of the reference spike being exclusive of the time period of the information spike;

e) means for combining the information spike and the reference spike as an analog information pulse for each source digital signal within the allocated time slot of the source digital signal;

f) means for transmitting the information pulse for each source digital signal;

g) means for receiving the information pulse for each source digital signal;

h) means for extracting analog magnitudes for the information spike and the reference spike portions of each information pulse received during the allocated time slot for each source digital signal as referenced to successive synchronization pulses;

i) means for generating digital signals having digital magnitudes which are a function of the extracted analog magnitudes for the information spike and the reference spike portions respectively of each information pulse received during the allocated time slot for each source digital signal;

j) means for calibrating the digital magnitude of the information spike portion of each information pulse received, by comparison of the digital magnitude of the reference spike portion of the information transmitted and the digital magnitude of the reference spike portion of the information pulse as received.

8. An apparatus as claimed in claim 7 wherein the means for generating said analog information spike for said source digital signals, the means for generating reference spikes, the means for combining the information spikes and the reference spikes as information pulses, and the means for transmitting the information pulses within the allocated time slots are deployed at a plurality of transmission locations.

9. An apparatus as claimed in claim 7 wherein the means for receiving the information pulses within the allocated time slots, the means for extracting the analog magnitudes for the information spike portion and the reference spike portion of the information pulses received during the allocated time slots, the means for generating digital signals having digital magnitudes which are a function of said extracted analog magnitudes for the information spike portion and the reference spike portion of the information pulses, and the means for calibrating the digital magnitudes of the information spike portion of the information pulses received are deployed at a plurality of receiving locations.

10. An apparatus as claimed in claim 7 wherein the means for generating an analog information spike for each source digital signal generates an analog information spike for each such said source digital signal which is proportional to the magnitude of the corresponding source digital signal as measured during the allocated time slot for the signal.

11. An apparatus as claimed in claim 7 wherein the means for generating digital signals for each received information pulse generates digital signals having digital magnitudes which are proportional to the extracted analog magnitudes for the information spike and reference spike portions respectively of each information pulse received.

12. An apparatus for digital information transfer comprising:

a) a synchronization pulse generation circuit;

b) a circuit for allocating one or more source digital signals to unique time slots between successive synchronizing pulses;

c) one or more digital to analog convertors for generating an analog information spike for each source digital signal, the magnitude of which is a function of the magnitude of the corresponding source digital signal as measured during the allocated time slot for the source digital signal;

d) one or more wave form generators for generating an analog reference spike during the allocated time slot of each source digital signal, the time period of the reference spike being exclusive of the time period of the information spike;

e) one or more circuits for combining the information spike and the reference spike as an analog information pulse for each source digital signal within the allocated time slot of the source digital signal;

f) one or more transmitters for transmitting the information pulse for each source digital signal;

g) one or more receivers for receiving the information pulse for each source digital signal;

h) one or more circuits for extracting analog magnitudes for the information spike and the reference spike portions respectively of each information pulse received during the allocated time slot for each source digital signal as referenced to successive synchronization pulses;

i) one or more analog to digital convertors for generating digital signals having digital magitudes which are a function of the extracted analog magnitudes for the information spike and the reference spike portions respectively of each information pulse received during the allocated time slot for each source digital signal;

j) one or more circuits for calibrating the digital magnitude of the information spike portion of each information pulse received by comparison of the digital magnitude of the reference spike portion of the information pulse as transmitted and the digital magnitude of the reference spike portion of the information pulse as received.

13. An apparatus as claimed in claim 12 wherein the digital to analog convertors for generating analog information spikes for the source digital signals, the wave form generators for generating reference spikes, the circuits for combining the information spike and the reference spike as information pulses for the source digital signals within the allocated time slots, and the transmitters for transmitting the information pulses for the source digital signals are located at a plurality of transmission locations.

14. An apparatus as claimed in claim 12 wherein the receivers, the circuits for extracting analog magnitudes for the information spike and the reference spike portions of the information pulses received during the allocated time slot for the source digital signals as referenced to successive synchronization pulses, the analog to digital convertors for generating digital signals having digital magnitudes which are a function of the extracted analog magnitudes for the information spike and the reference spike portions of the information pulses received during the allocated time slots for the source digital signals, and the circuits for calibrating the digital magnitudes of the information spike portion of the information pulses received are deployed at a plurality of receiving locations.

15. An apparatus as claimed in claim 12 wherein the digital to analog convertors for generating said analog information spike for each source digital signal generate an analog information spike for each such said source digital signal which is proportional to the magnitude of the corresponding source digital signal as measured during the allocated time slot for the signal.

16. An apparatus as claimed in claim 12 wherein the analog to digital convertors for generating digital signals for each received information pulse generate digital signals having digital magnitudes which are proportional to the extracted analog magnitudes for the information spike and reference spike portions respectively of each information pulse received.

17. An apparatus for digital information transfer comprising:

a) means for generating synchronizing pulses of uniform wave form and frequency;

b) means for transmitting said synchronizing pulses to one or more remote transmission locations;

c) means for receiving said synchronizing pulses at each remote transmission location;

d) means for allocating a source digital signal at each remote transmission location to a unique time slot between successive synchronizing pulses;

e) means for generating an analog information spike for each source digital signal, the magnitude of which is a function of the magnitude of the corresponding source digital signal as measured during the allocated time slot for the source digital signal;

f) means for generating an analog reference spike during the allocated time slot of each source digital signal, the time period of the reference spike being exclusive of the time period of the information spike;

g) means for combining the information spike and the reference spike as an analog information pulse for each source digital signal within the allocated time slot of the source digital signal;

h) means for transmitting the information pulse for each source digital signal from each remote transmission location;

i) means for receiving, at one or more locations, the information pulse for each source digital signal transmitted from each remote transmission location;

j) means for extracting analog magnitudes for the information spike and the reference spike portions respectively of each information pulse received, at one or more locations, during the allocated time slot for each source digital signal as referenced to successive synchronization pulses;

k) means for generating digital signals having digital magnitudes which are a function of the extracted analog magnitudes for the information spike and the reference spike portions respectively of each information pulse received during the allocated time slot for each source digital signal;

l) means for calibrating the digital magnitude of the information spike portion of each information pulse received by comparison of the digital magnitude of the reference spike portion of the information pulse as transmitted and the digital magnitude of the reference spike portion of the information pulse as received.

18. An apparatus as claimed in claim 17 wherein the means for generating said analog information spike for each source digital signal generates an analog information spike for each such said source digital signal which is proportional to the magnitude of the corresponding source digital signal as measured during the allocated time slot for the signal.

19. An apparatus as claimed in claim 17 wherein the means for generating digital signals for each received information pulse generates digital signals having digital magnitudes which are proportional to the extracted analog magnitudes for the information spike and reference spike portions respectively of each information pulse received.

20. A method for digital information transfer comprising the steps of:

a) allocating one or more source digital signals to unique, repetitive time slots;

b) generating an analog information pulse for each said source digital signal, the magnitude of which is a function of the magnitude of the corresponding source digital signal as measured during the allocated time slot for the signal;

c) transmitting each of the information pulses within its allocated time slot;

d) generating and transmitting repetitive analog reference pulses, at least one reference pulse being generated and transmitted for each cycle of the time slots for the source digital signals;

e) receiving each of the information pulses within its allocated time slot and receiving each of the analog reference pulses;

f) extracting an analog magnitude for each information pulse received during its allocated time slot and extracting an analog magnitude for each reference pulse received; and g) generating output digital signals having digital magnitudes which are a function of said extracted analog magnitudes, said digital magnitudes being calibrated by comparison of the magnitudes of the reference pulses as transmitted and the magnitudes of the reference pulses as received.

21. Method claimed in claim 20 wherein the step of calibrating the output digital signal magnitudes to correct for signal attentuation, losses, noise, distortion and interference is included.

22. Method claimed in claim 20 wherein the step of generating said analog information pulses for said source digital signals, the step of transmitting the information pulses within the allocated time slots, and the step of generating and transmitting repetitive analog reference pulses are performed at a plurality of transmission locations.

23. Method claimed in claim 20 wherein the step of receiving the information pulses within the allocated time slots, the step of extracting the analog magnitudes for the information pulses received during the allocated time slots, and the step of generating output digital signals having digital magnitudes which are a function of said extracted analog magnitudes are performed at a plurality of receiving locations.

24. Method claimed in claim 20 wherein the step of generating said analog information pulses further provides that the magnitude of the analog information pulse generated for each said source digital signal is proportional to the magnitude of the corresponding source digital signal as measured during the allocated time slot for the signal.

25. Method claimed in claim 20 wherein the output digital signals generated have digital magnitudes which are proportional to said extracted analog magnitudes.

26. A method for digital information transfer comprising the steps of:

a) generating synchronizing pulses of uniform wave form and frequency;

b) allocating one or more source digital signals to unique time slots between successive synchronizing pulses;

c) generating an analog information spike for each source digital signal, the magnitude of which is a function of the magnitude of the corresponding source digital signal as measured during the allocated time slot for the source digital signal;

d) generating an analog reference spike during the allocated time slot of each source digital signal, the time period of the reference spike being exclusive of the time period of the information spike;

e) combining the information spike and the reference spike as an analog information pulse for each source digital signal within the allocated time slot of the source digital signal;

f) transmitting the information pulse for each source digital signal;

g) receiving the information pulse for each source digital signal;

h) extracting analog magnitudes for the information spike and the reference spike portions respectively of each information pulse received during the allocated time slot for each source digital signal as referenced to successive synchronization pulses;

i) generating digital signals having digital magnitudes which are a function of the extracted analog magnitudes for the information spike and the reference spike portions respectively of each information pulse received during the allocated time slot for each source digital signal;

j) calibrating the digital magnitude of the information spike portion of each information pulse received by comparison of the digital magnitude of the reference spike portion of the information pulse as transmitted and the digital magnitude of the reference spike portion of the information pulse as received.

27. Method claimed in claim 26 wherein the step of generating said analog information spike for said source digital signals, the step of generating reference spikes, the step of combining the information spikes and the reference spikes as information pulses, and the step of transmitting the information pulses within the allocated time slots are performed at a plurality of transmission locations.

28. Method claimed in claim 26 wherein the step of receiving the information pulses within the allocated time slots, the step of extracting the analog magnitudes for the information spike portion and the reference spike portion of the information pulses received during the allocated time slots, the step of generating digital signals having digital magnitudes which are a function of the extracted analog magnitudes for the information spike portion and the reference spike portion of the information pulses, and the step of calibrating the digital magnitudes of the information spike portion of the information pulses received are performed at a plurality of receiving locations.

29. Method claimed in claim 26 wherein the step of generating analog information spikes further provides that the magnitude of the analog information spike generated for each said source digital signal is proportional to the magnitude of the corresponding source digital signal as measured during the allocated time slot for the signal.

30. Method claimed in claim 26 wherein the step of generating digital signals for the extracted analog magnitudes of the analog information spikes and reference spikes respectively for information pulses received, further provides that the digital signals generated for the received analog information spikes and the analog reference spikes respectively have digital magnitudes which are proportional to the analog magnitudes extracted.

31. A method for digital information transfer comprising the steps of:

a) generating synchronizing pulses of uniform wave form and frequency;

b) transmitting said synchronizing pulses to one or more remote transmission locations;

c) receiving said synchronizing pulses at each remote transmission location;

d) allocating a source digital signal at each remote transmission location to a unique time slot between successive synchronizing pulses;

e) generating an analog information spike for each source digital signal, the magnitude of which is a function of the magnitude of the corresponding source digital signal as measured during the allocated time slot for the source digital signal;

f) generating an analog reference spike during the allocated time slot of each source digital signal, the time period of the reference spike being exclusive of the time period of the information spike;

g) combining the information spike and the reference spike as an analog information pulse for each source digital signal within the allocated time slot of the source digital signal;

h) transmitting the information pulse for each source digital signal from each remote transmission location;

i) receiving, at one or more locations, the information pulse for each source digital signal transmitted from each remote transmission location;

j) extracting analog magnitudes for the information spike and the reference spike portions respectively of each information pulse received, at one or more locations, during the allocated time slot for each source digital signal as referenced to successive synchronization pulses;

k) generating digital signals having digital magnitudes which are a function of the extracted analog magnitudes for the information spike and the reference spike portions respectively of each information pulse received during the allocated time slot for each source digital signal;

l) calibrating the digital magnitude of the information spike portion of each information pulse received by comparison of the digital magnitude of the reference spike portion of the information pulse as transmitted and the digital magnitude of the reference spike portion of the information pulse as received.

32. Method claimed in claim 31 wherein the step of generating analog information spikes further provides that the magnitude of the analog information spike generated for each said source digital signal is proportional to the magnitude of the corresponding source digital signal as measured during the allocated time slot for the signal.

33. Method claimed in claim 31 wherein the step of generating digital signals having digital magnitudes which are a function of the extracted analog magnitudes for the information spike and reference spike portions respectively of each information pulse received, further provides that the digital signals generated for the analog information spike and the analog reference spike portions respectively of each information pulse received have digital magnitudes which are proportional to the analog magnitudes extracted.

34. An apparatus as claimed in claim 1 wherein the means for generating an analog information pulse for each said source digital signal further includes a means for simultaneously inputing and adding the analog magnitudes of two or more source signals for a single information pulse.

35. An apparatus as claimed in claim 7 wherein the means for generating an analog information spike for each source digital signal further includes a means for simultaneously inputing two or more source digital signals, generating an analog information spike for each signal, and adding the analog information spike values of said two or more source digital signals before combining with a reference spike as an information pulse.

36. An apparatus as claimed in claim 12 further including one or more additional digital to analog convertors to permit the simultaneous input of two or more source digital signals and including an analog adder for adding the analog magnitudes of the information spikes for said two or more source digital signals before combining with the reference spike as an analog information pulse.

37. An apparatus as claimed in claim 17 wherein the means for generating an analog information spike for each source digital signal further includes a means for simultaneously inputing two or more source digital signals, generating an analog information spike for each signal, and adding the analog magnitudes of said analog information spikes of said two or more source digital signals before combining with a reference spike as an information pulse.

38. Method claimed in claim 20 wherein the step of generating an analog information pulse for each source digital signal further includes the step of simultaneously inputing and adding the analog magnitudes of two or more source signals for a single information pulse.

39. Method claimed in claim 26 wherein the step of generating an analog information spike for each source digital signal further includes a step of simultaneously inputing two or more source digital signals, generating an analog information spike for each signal, and adding the analog information spike values of said two or more source digital signals before combining with a reference spike as an information pulse.

40. Method claimed in claim 31 wherein the step of generating an analog information spike for each source digital signal further includes a step of simultaneously inputing two or more source digital signals, generating an analog information spike for each signal, and adding the analog information spike values of said two or more source digital signals before combining with a reference spike as an information pulse.

41. An apparatus for digital information transfer comprising:

a) a synchronization pulse generation circuit;

b) a circuit for allocating one or more source digital signals to allocated time slots between successive synchronization pulses;

c) two or more digital to analog convertors for simultaneously receiving, within allocated time slots, two or more source digital signals which are allocated the same time slot, and converting the signals to analog, thereby simultaneously generating an analog information signal for each of said two or more source digital signals, the magnitude of which analog information signals are a function of the magnitude of the corresponding source digital signals as measured during the allocated time slot for the source digital signals;

d) an adder to add the analog magnitudes of the simultaneously generated analog information signals within each allocated time slot to generate an analog information spike from the added analog information signals;

e) one or more wave form generators for generating an analog reference spike during the allocated time slot of each source digital signal, the time period of the reference spike being exclusive of the time period of the information spike;

f) one or more circuits for combining the information spike and the reference spike as an analog information pulse for each source digital signal within the allocated time slot of the source digital signal;

g) one or more transmitters for transmitting the information pulse for each source digital signal;

h) one or more receivers for receiving the information pulse for each source digital signal;

i) one or more circuits for extracting analog magnitudes for the information spike and the reference spike portions respectively of each information pulse received during the allocated time slot for each source digital signal as referenced to successive synchronization pulses;

j) one or more analog to digital convertors for generating digital signals having digital magnitudes which are a function of the extracted analog magnitudes for the information spike and the reference spike portions respectively of each information pulse received during the allocated time slot for each source digital signal;

k) one or more circuits for calibrating the digital magnitude of the information spike portion of each information pulse received by comparison of the digital magnitude of the reference spike portion of the information pulse as transmitted and the digital magnitude of the reference spike portion of the information pulse as received.

42. An apparatus as claimed in claim 41 wherein the digital to analog convertors for generating analog information spikes for the source digital signals, the adder, the wave form generators for generating reference spikes, the circuits for combining the information spike and the reference spike as information pulses for the source digital signals within the allocated time slots, and the transmitters for transmitting the information pulses for the source digital signals are located at a plurality of transmission locations.

43. An apparatus as claimed in claim 41 wherein the receivers, the circuits for extracting analog magnitudes for the information spike and the reference spike portions respectively of each information pulse received during the allocated time slot for each source digital signal as referenced to successive synchronization pulses, the analog to digital convertors for generating digital signals having digital magnitudes which are a function of the extracted analog magnitudes for the information spike and the reference spike portions respectively of each information pulse received during the allocated time slot for each source digital signal, and the circuits for calibrating the digital magnitude of the information spike portion of each information pulse received are deployed at a plurality of receiving locations.

44. An apparatus as claimed in claim 41 wherein the digital to analog convertors for generating an analog information spike for each source digital signal generate an analog information spike for each such said source digital signal which is proportional to the magnitude of the corresponding source digital signal as measured during the allocated time slot for the signal.

45. An apparatus as claimed in claim 41 wherein the analog to digital convertors for generating digital signals having digital magnitudes which are a function of the extracted analog magnitudes for the information spike and the reference spike portions respectively of each information pulse received during the allocated time slot for each source digital signal generate digital signals having digital magnitudes which are proportional to the extracted analog magnitudes for the information spike and reference spike portions respectively of each information pulse received.

* * * * *

UNITED STATES PATENT AND TRADEMARK OFFICE
CERTIFICATE OF CORRECTION

PATENT NO. : 5,517,528
DATED : May 14, 1996
INVENTOR(S) : Neldon P. Johnson

It is certified that error appears in the above-indentified patent and that said Letters Patent is hereby corrected as shown below:

Column 11, line 10,
Subparagraph j) of Claim 7 is corrected to read as follows:
j) means for calibrating the digital magnitude of the information spike portion of each information pulse received, by comparison of the digital magnitude of the reference spike portion of the information pulse as transmitted and the digital magnitude of the reference spike portion of the information pulse as received.

Signed and Sealed this

First Day of October, 1996

*Attest:*

BRUCE LEHMAN

*Attesting Officer*  Commissioner of Patents and Trademarks